E. TYDEN.
GREASE CUP.
APPLICATION FILED FEB. 5, 1916.

1,258,723.

Patented Mar. 12, 1918.

Witnesses:

Inventor
Emil Tyden.
by Burton & Burton
his Attys

UNITED STATES PATENT OFFICE.

EMIL TYDEN, OF EVANSTON, ILLINOIS.

GREASE-CUP.

1,258,723. Specification of Letters Patent. Patented Mar. 12, 1918.

Application filed February 5, 1916. Serial No. 76,260.

*To all whom it may concern:*

Be it known that I, EMIL TYDEN, a citizen of the United States, and resident of Evanston, in the county of Cook and State of Illinois, have invented new and useful Improvements in Grease-Cups, of which the following is a specification, reference being had to the accompanying drawings, forming a part thereof.

The purpose of this invention is to provide an improved form of grease cup of the general character or type in which provision is made for forcing the grease from the cup into the bearing to be lubricated. It consists in the elements and features of construction shown and described, as indicated in the claims.

In the drawings:—

Figure 1:
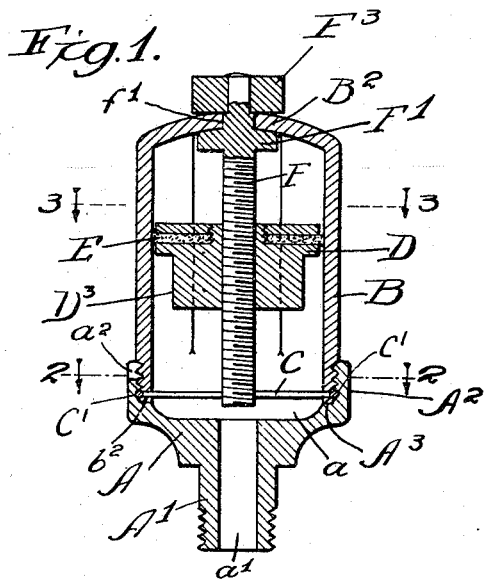
Figure 1 is an axial section of a grease cup embodying this invention.
Figure 2:
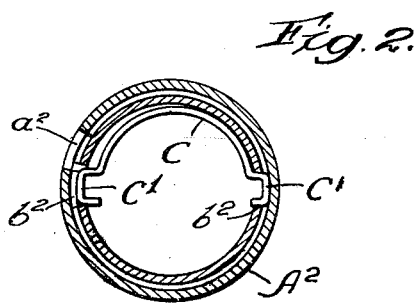
Fig. 2 is a transverse section at the line, 2—2, on Fig. 1.

The grease cup shown in the drawings comprises a base member, A, having a stem, $A^1$, by which it is connected with the bearings to be lubricated and having a discharge duct, $a^1$, through that stem opening up into the enlarged chamber, $a$, of the base which is open at the upper end for attaching the grease chamber or container, B. The base has a cylindrical threaded flange, $A^2$, to which the container, B, is screwed, and at the base of which it is stopped against a stop shoulder, against which it is designed to be screwed tight. For guarding against the accidental unscrewing of the container from the base which might happen from the jolting of the machine to which the grease-cup is attached if the container were not carefully screwed down tight onto the stop shoulder, there is provided a detent and semi-locking device consisting of a spring, C, which may be made of wire as shown, or may be made of other form coiled so as to fit within the open end of the container and to be retained in position therein by one or more spurs,—as illustrated, two, one at each end of the spring,—such spur or spurs, $C^1$, protruding out through an aperture, $b^2$, made through the threaded portion of said end of the container, and adapted to protrude far enough to engage an aperture or notch, $a^2$, in the threaded flange, $A^2$, of the base, the relative position of the apertures, $a^2$ and $b^2$, in the threaded portions of the two parts which are screwed together being such that said apertures will register and permit the spur to protrude through them both and engage the two parts together before the container becomes unscrewed from the base. Preferably this registration is made to occur when the parts are engaged to the extent of one or two threads, but the distance may be more or less, the purpose and result being that the spring catch, C, engages the two members together to a sufficient extent to prevent them from being unscrewed by the jolting, but not so but that the container can be readily screwed and unscrewed by hand, such engagement occurring in time to prevent separation of the container. The spur, $C^1$, is formed so as to engage the thread of the base frictionally, and it may be formed so as to affect such engagement strongly enough to practically prevent the unscrewing of the container by jolting even without the more positive engagement effected by means of the registered apertures of the two parts.

Figure 3:
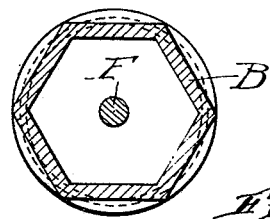
Fig. 3 is a section at the line, 3—3, on Fig. 1.

For expelling the grease from the container it is provided with a piston or follower, D, fitted to the cavity of the container for traveling axially therein with a sufficiently tight fit which may be effected by any customary means of packing, such as the leather disk or ring, E, shown as forming one member of the piston or follower. The piston is designed to be advanced axially and retracted in the chamber of the container by means of a threaded stem or shaft, F, journaled and longitudinally stopped in the closed end, $B^2$, of the container, said screw shaft being formed with a flange, $F^1$, back of the portion, $f^1$, which is to form the journal of the shaft in the head, the screw shaft being inserted through the head from within the container and having its protruding end above the top of the container riveted into an exterior manipulating head or knob, $F^3$. For preventing the piston from rotating in the container, as well as for other reasons which make it desirable, the container is non-circular in cross-section. A desirable form is that shown in Figs. 1 and 3, the container being made of sheet metal stamped or drawn into the form shown, being hexagonal in cross-section from the upper closed end down to within a short distance of the open end which is circular for the purpose of receiving the interior thread by which the container is secured to the base, the circle which defines the interior of the circular end portions being of course circumscribed about the hexagon which defines the interior of the upper portion, so that the piston or follower may be freely entered through the circular end into the hexagonal portion which it fits.

Figure 5:
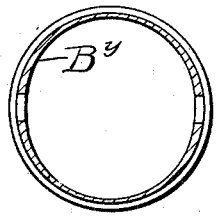
Fig. 5 is a similar view showing another modification.
Figure 6:
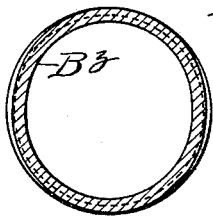
Fig. 6 is a similar view showing a fourth modified form.

Another quite desirable form is shown in Fig. 5 in which the container above the threaded portion at the open end, instead of being angular, is slightly flattened from the circular form so as to be oval, the difference between the longer and shorter diameters, however, being less than the thickness of the metal, so that after being flattened or drawn into the flattened form, it can be threaded at the open end, leaving sufficient stock at the thinnest part and sufficient thread at the thickest part for effective engagement with the base. In Fig. 6, a form substantially the same as that shown in Fig. 5 is illustrated, but designed to be drawn so as to be circular at the open threaded end with the full thickness of the metal available for the thread, but oval or flattened above the threaded portion, the longer diameter of the oval portion being the uniform diameter of the circular portion.

Figure 4:
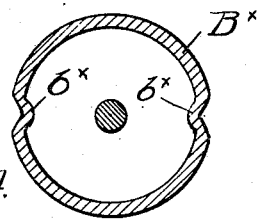
Fig. 4 is a view similar to Fig. 3, showing the container of modified form in cross section.

Another desirable form is shown in Fig. 4 which represents the container as stamped or drawn from sheet metal being formed circular in cross-section for a short distance at the open threaded end and above the portion formed with one or more longitudinal inwardly-impressed ribs or corrugations, $b^x$. It will be understood that the piston or follower in each case is conformed to the cross-sectional form of the chamber in which it moves above the circular threaded portion of the container.

In all these forms shown, it is preferable to provide the piston or follower, D, with a central boss, $D^3$, which extends down through or past the spring catch device, C, so as to stop upon the bottom of the cavity, $a$, of the base and arrest the feeding movement of the piston before it is crowded against the spring, and this boss also serves the further purpose of expelling the grease which would otherwise remain unexpelled in the upper open end cavity of the base from the level of the top of the spring to the bottom of the cavity.

I claim:—

1. In combination with a base having a discharge duct leading from it; a threaded cylindrical flange and an annular stop shoulder at the base of the flange; a cup-shaped container threaded at the open end for screwing to the base and being stopped on the annular stop shoulder of the base; a spring lodged within the inner of the two members thus screwed together, said inner member having an aperture through its threaded part, the spring having a spur or finger projecting through the aperture; the outer member having one aperture through its threaded part positioned for engagement by the spur of the spring.

2. In combination with a base having a discharge duct and an enlarged cavity from which the duct leads, a container having one end open and screwed to the base, the base having a stop shoulder against which the container is adapted to be screwed tight, a spring lodged within the inner of the two members, said inner member having an aperture through its threaded part and the spring having a spur or finger projecting through the aperture, the outer member having one aperture through its threaded part positioned for engagement by said spur at the position of the container at which it is only partly screwed home to the stop shoulder, said spring being formed so as to be open at the central portion of the base cavity; a threaded shaft journaled in and longitudinally stopped in the head which closes one end of the container, and a piston or follower in its chamber through which the threaded shaft is screwed for driving the follower longitudinally of the chamber by rotating the threaded shaft, said piston or follower having a central boss on the side toward the base, dimensioned for passing through the open center of the spring and stopping upon the bottom of the cavity of the base by the time the follower reaches the spring at the position of the members at which the spring is engaged with registered apertures.

3. In combination with a base having a discharge duct and threaded for attachment of a container, and having an enlarged cavity from which the duct leads, a container open at one end and threaded for attachment to the base around said enlarged cavity; a piston or follower in the container engaged non-rotatably therewith; a threaded shaft journaled and longitudinally stopped in the head of the container, screwed through the piston and having exterior means for rotating it, the piston having at the side toward the base a boss into and through which said shaft is screwed which is radially continuous from said shaft to the outer circumference of said boss which is adapted to enter and approximately fully occupied the enlarged cavity of the base while engaged with the threaded shaft.

In testimony whereof I have hereunto set my hand at Chicago, Illinois, this 1st day of February, 1916.

EMIL TYDEN.

Copies of this patent may be obtained for five cents each, by addressing the "Commissioner of Patents, Washington, D. C."